United States Patent [19]

Walters

[11] Patent Number: 4,991,054
[45] Date of Patent: Feb. 5, 1991

[54] TIME-DELAY OUTDOOR LIGHTING CONTROL SYSTEMS

[75] Inventor: Jeff Walters, Marshfield, Mass.

[73] Assignee: Pacific Scientific Company, Weymouth, Mass.

[21] Appl. No.: 194,418

[22] Filed: May 13, 1988

[51] Int. Cl.$^5$ .............................. H01H 47/26
[52] U.S. Cl. ..................... 361/165; 361/173; 315/159
[58] Field of Search .............. 361/165, 173, 175; 307/117; 315/156, 159; 340/600; 250/214 AL, 214 B, 215; 362/802

[56] References Cited

U.S. PATENT DOCUMENTS

| | | | |
|---|---|---|---|
| 3,351,762 | 11/1967 | Adkins et al. | 361/173 |
| 4,207,501 | 6/1980 | Smallegan | 315/159 |
| 4,771,186 | 9/1988 | Basso | 307/117 |

OTHER PUBLICATIONS

SL Application Notes, Sensor Labs, Inc., (undated).
Fenwal Electronics, Thermistor Manual, 1974, pp. 1, 4, 5, 6, 9 & 10.
Midwest Components Inc., General Characteristics of Thermistors.
Midwest Components Inc., Switching Thermistors, pp. 4 & 5.
Keystone NTC & PTC Thermistors & Probe Assemblies, 1984, pp. 1, 9, 11, 12, 37, 38 & 39.
Murata Erie No. America, Posistors for Circuit Protection, 1986, pp. 1 & 5.

Primary Examiner—L. T. Hix
Assistant Examiner—David M. Gray
Attorney, Agent, or Firm—Stanger, Michaelson, Spivak & Wallace

[57] ABSTRACT

An optical lighting control, such as that used to control street lamps, delays the response of the lamps to changes of illumination while the lamps are on at night but avoids the delay in response to daylight. Thus, headlamps, flashlights, and lightning flashes of brief duration do not cause the control to turn off the street lamps. However, the street lights turn off without this delay in response to daylight.

34 Claims, 1 Drawing Sheet

TIME-DELAY OUTDOOR LIGHTING CONTROL SYSTEMS

BACKGROUND OF THE INVENTION

This invention relates to photocontrols or outdoor lighting controls (OLCs) of the type which switch illuminating fixtures on and off in response to changes in ambient light, and in particular to improved outdoor lighting controls that avoid responses to short term or momentary light flashes. The invention relates to systems using such controls.

Outdoor lighting controls are generally mounted on lamp poles near the lamps they control. In one type of outdoor lighting control, the relay type, a photocell or photoresistor instantly actuates a relay. This causes the outdoor lighting control or photocontrol to respond instantly to changes in ambient light. The OLC turns a lamp on as soon as the light drops below a given level at dusk, and turns the lamp off when the light reaches a given brightness at dawn. However many outdoor lamps such as mercury vapor lamps, sodium vapor lamps, and or other high intensity discharge lamps require about five minutes to restrike once they have been shut off. Thus when an OLC shuts off mercury or sodium vapor lamps the latter remain off for about five minutes.

Accordingly, a lightning flash during the night can cause a relay type OLC to shut off a lighting system and force the lighting system to remain down during the five minute restrike time. This creates not only an inconvenience, but a security problem.

In another type of lighting control, a thermal OLC, a bimetallic strip responds slowly to current in a photocell and turns a system on and off only after a delay of about 30 seconds to 2 minutes. Such thermal outdoor lighting controls often require substantial time for installation and testing. For example, when installing an OLC a line operator performs a so-called "glove test". That is, the operator covers the photocell of the OLC to simulate darkness and then waits 30 sec-120 sec for all lamps regulated by the control to light or at least give off a glow indicating a restrike. He must then uncover the thermal OLC and wait again to make sure the lamps go off. As a final check, he may again cover the lamps to see if the lamps light or start to restrike. While such delays may appear not to be costly, a line operator is usually accompanied by expensive equipment and perhaps a ground worker. Even at only a few minutes per installation, several hours per day may be occupied waiting during the test, all at a substantial cost.

OBJECT AND SUMMARY OF THE INVENTION

An object of this invention is to improve photocontrols or outdoor lighting controls.

Another object of this invention is to avoid the aforementioned deficiencies.

Yet another object of the invention is to permit easy testing during installation.

Yet another object of the invention is to prevent turnoff of lights in response to momentary flashes of light while at the same time avoiding other undesired delays.

According to a feature of the invention, these objects are attained, in whole or in part, by energizing the lamps with a switch coupled to an operating arrangement which responds to ambient light in a first light range at a slower rate than to light in a dimmer second light range and to light in a brighter third light range. According to another feature of the invention, the arrangement responds in about 15 seconds in the first light range between 2 and 10 foot candles, and in less than one second in the second range less than 1 foot candle and the third range representing daylight between 20 and 10,000 foot candles.

According to another feature of the invention, the arrangement includes a relay, a light measuring member, and a positive temperature coefficient (PTC) thermistor shunting the relay.

According to another feature of the invention, the thermistor exhibits a low resistance over a majority of its normal operating temperature region and a sharp rise in its resistance over several orders of magnitude when it reaches a predetermined temperature.

These and other features of the invention are pointed out in the claims. Other objects and advantages of the invention will become evident from the following detailed description when read in view of the accompanying drawings.

DETAILED DESCRIPTION OF PREFERRED EMBODIMENTS

Figure 1:
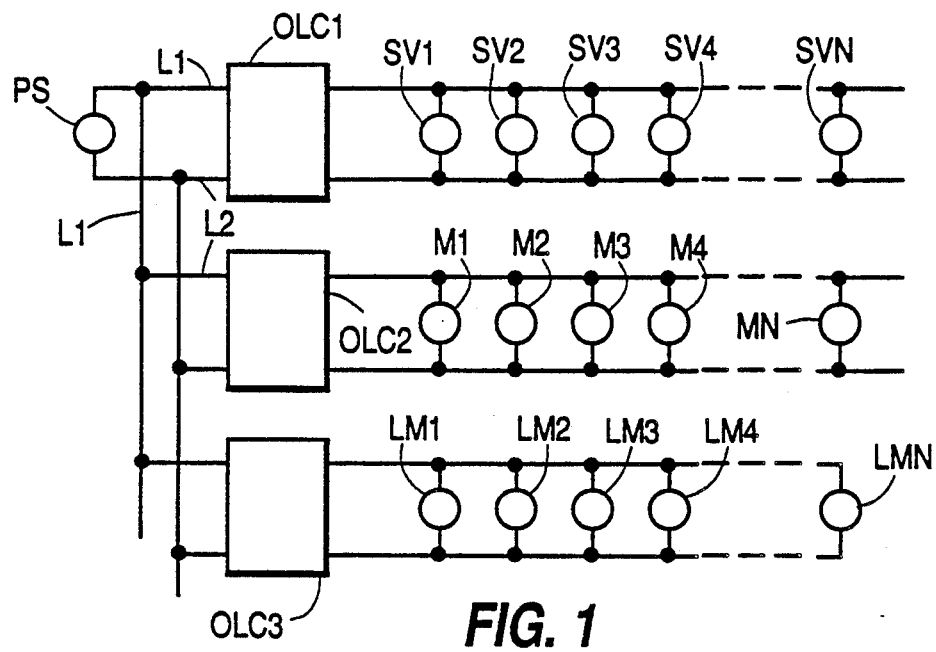
FIG. 1 is a schematic diagram of a utility system using outdoor lighting controls embodying features of the invention.

In FIG. 1, Sodium Vapors Lamps SV1, SV2, SV3, SV4, . . . SVN illuminate an area in response to a utilities power source PS and under the control of an outdoor lighting control OLC1 mounted on a utility pole. This outdoor lighting control turns the lamps SV1 to SVN on and off in response to ambient light.

A second outdoor lighting control (OLC2) turns mercury lamps M1, M2, M3, M4, . . . MN on and off in response to ambient light. The source PS also powers the mercury lamps M1 to MN.

Similar outdoor lighting controls OLC3 . . . allow the power source PS to energize other lamps LM1 to LMN.

Figure 2:
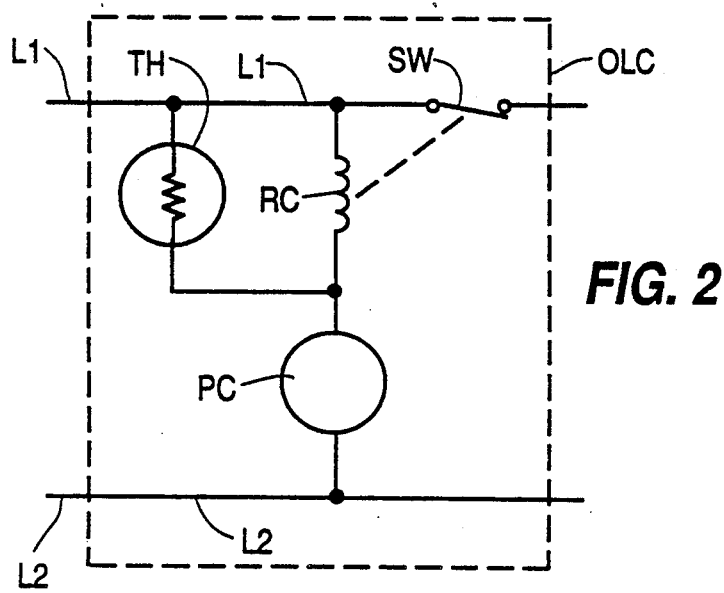
FIG. 2 is a circuit diagram of an outdoor lighting control of the type use in FIG. 1 and embodying features of the invention.

FIG. 2 illustrates controls OLC1, OLC2, and OLC3 all of which are mounted on utility poles, not shown. Here a photocell PC connects a relay coil RC in series across power lines L1 and L2. The coil RC opens a normally closed switch SW in response to currents exceeding a predetermined value through the coil. The photocell PC exhibits a resistance that is inversely proportional to the ambient light. Accordingly, when the ambient light is bright, the photocell PC exhibits a low impedance that allows large currents to flow therethrough. In darkness, the photocell PC exhibits a high impedance which limits the current through the relay coil RC. With low current the switch SW responds to the relay coil RC by remaining closed. When the relay coil RC passes high current as a result of intense illumination of the photocell PC it opens the switch SW.

A positive temperature coefficient (PTC) thermistor TH shunted across the coil RC draws a portion of the current away from the relay coil RC. When the resistance of the thermistor TH is or becomes low, the latter shunts most of the current through the photocell PC away from the relay coil RC and causes the latter to maintain the switch SW in, or release the switch SW to, its normally closed position. When the resistance of the thermistor TH rises substantially above the value of the impedance of the relay coil RC, the thermistor has little effect upon the relay coil and allows the relay coil to operate directly in response to the photocell PC. Hence, when the photocell PC is illuminated intensely while the thermistor TH is hot and exhibits a high impedance large amounts of currents flow through the coil RC and constrain the latter to open the switch SW. In darkness, the photocell PC imposes a high impedance in series with the relay coil RC and limits its current so that the switch SW remains closed.

Figure 3:
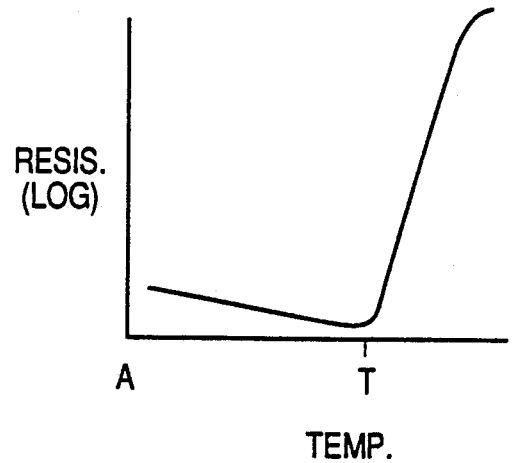
FIG. 3 is a graph illustrating the logarithmic variation of resistance with respect to temperature of a thermistor in FIG. 2.

FIG. 3 illustrates the resistance-temperature curve of a positive temperature coefficient thermistor TH. Here, the resistance along the ordinate increases logarithmically. The thermistor TH exhibits a drop in resistance as temperature rises over a majority of its normal operating temperature region, namely from A to the transition temperature T. That is, in the region A to T the thermistor exhibits a slightly negative temperature coefficient. At the transition temperature T, corresponding to the Curie temperature of the material of the thermistor, the latter produces a sharp rise in resistance which may be of several orders of magnitude. The change in characteristics arises because of changes in the properties of the material at the Curie temperature.

The relay coil RC is initially adjusted to open and close the switch SW on the basis of operation with the photocell PC as if the thermistor TH were out of the circuit altogether. In this initial adjustment, the coil RC allows the switch SW to close when the coil carries a current corresponding to less than a threshold light level of 1 foot candle impinging on the photocell PC. Because the switch SW closes a magnetic circuit with the relay coil RC, it causes some hysteresis. Thus, relay coil RC opens the switch in response to current corresponding to 2 foot candles or more impinging on the photocell PC. Both 1 and 2 foot candles may be regarded as threshold levels forming a threshold between light ranges.

The effect of the thermistor TH depends upon the speed at which the thermistor TH reaches its transition temperature and exhibits a high impedance. Hence the extent of the delay in lighting the lamp SV1 to LMN depends on the magnitude of the current which the photocell PC allows to pass through the thermistor TH. The current's magnitude varies with the brightness of light impinging upon the photocell PC. If light such as full daylight, in a range between 20 to 10,000 foot candles, strikes the photocell PC, the initial current flow through the thermistor TH is high and the latter reaches its high resistance condition within a second. Headlamps, flashlights, and even lightning in a night sky, cause much smaller amounts of light, in a range between 2 and 10 foot candles, to strike the pole-mounted photocell PC which then generates much lower initial currents in the thermistor TH. In response to these stimuli, between 2 and 10 foot candles, the thermistor takes about 15 seconds to reach its high resistance condition. If the lower-brightness light is terminated before that time, the relay coil RC allows the switch SW to remain closed and the lamps SV1 to SVN, M1 to MN, and LM1 to LMN to continue their illumination. Light in a third light range of less than one foot candle does not allow the photocell PC to turn off the lamps at all.

The ambient light produced by the lamps SV1 to SVN, M1 to MN, and LM1 to LMN is insufficient to change the resistance of the photocell PC enough to draw actuating current through the thermistor TH and the relay coil RC to turn off the lights.

In operation, the power source PS applies voltage for use by the lamps SV1 to SVN, M1 to MN, and LM1 to LMN. The controls OLC1, OLC2, OLC3, etc., turn on the lamps in response to darkness and turn them off in response to daylight. During daylight, and in the quiescent conditions, the photocell PC in each control OLC1, OLC2, OLC3, etc. imposes a very low resistance in series with the relay coil RC of each control and allows substantial currents to flow through the relay coil RC and the thermistor TH. At the same time, the high currents which the photocell PC allows to pass through the thermistor TH heat the thermistor and raise its temperature and resistance so that within one second it shunts very little of the current away from the relay coil RC. The relay coil therefore opens the switch SW within one second and keeps it open. Hence, no current flows to the lamps SV1 to SVN, M1 to MN, and LM1 to LMN.

When darkness falls, the resistance of the photocell PC rises. At a predetermined resistance value, the current through the relay coil RC drops to a point at which it releases the switch SW and allows it to close. At the same time, the decrease in current through the thermistor TH causes the latter to shunt current away from the relay coil RC thereby holding the latter off. The OLC's OLC1, OLC2, and OLC3 thereby energize the lamps SV1 to SVN, M1 to MN, and LM1 to LMN. At this time, the resistance of the thermistor TH is substantially low and most of the current which would otherwise pass through the relay coil RC passes through the thermistor TH.

In normal operation, when daylight resumes, light levels of between 20 to 10,000 foot candles impinge upon the photocell PC and the latter allows large currents to flow. Most of this current initially flows through the thermistor TH because of the latter's low resistance. The high current through the thermistor TH rapidly heats the latter and after a delay of less than one second constrains the latter to pass its transition temperature at which time the thermistor TH suddenly produces a high resistance across the relay coil RC. The high current now passes through the relay coil which opens the switch SW in less than one second after the light level reach 20 foot candles. Hence, the OLC's delay the extinction of the lamps SV1 to SVN, M1 to MN and LM1 to LMN, only minimally in this light range.

If now a dimmer source, such as an ordinary flashlight or automobile headlamps on a hill, causes light in a range between 2 to 10 foot candles to impinge upon the photocell PC, the resistance of the photocell PC suddenly drops and draws a moderate current, parts of which pass through the parallel connected thermistor TH and relay coil RC. The low impedance of the thermistor TH causes the latter to draw enough of current away from the relay coil RC to prevent it from actuating the switch SW. It takes about 15 seconds for the thermistor to heat and have its resistance rise under these conditions with the moderate current through the photocell. The relay coil RC therefore continues to allow the switch SW to remain closed. As long as the mid-range stimuli of 2 to 10 foot candles end before 15 seconds, the lamps remain on.

The invention prevents brief flashes of light during the night from turning off the lamps SV1 to SVN, M1 to MN, and LM1 to LMN. At the same time it permits full daylight to turn off the lights almost instantly. This offers a special advantage to utility companies whose personnel install and test the OLC's, and to manufacturers who test the OLC's.

In daylight, a utility company's line operator can climb a pole and test a newly installed or older outdoor lighting control with a so-called "glove-test". The operator can check to see if the lights are off in daylight and then cover the OLC with a gloved hand to prevent light from impinging upon the photocell PC. This raises the resistance of the photocell PC, deactuates the relay coil RC instantly, and permits the switch SW to close. This lights incandescent lamps and indicates that the OLC is operative. While this only initiates the restrike in some lamps, and does not turn such lamps on, the operator can see that the OLC is working from the restrike glow in the lamps. When the operator removes the gloved hand, the bright daylight drastically lowers the resistance of the photocell PC which generates a sufficiently high current through the thermistor TH to rapidly raise its resistance so that the relay coil RC opens the switch within a second or two. The lamps SV1 to SVN, M1 to MN, and LM1 to LMN thus turn off almost without delay. The operator can perform the test several times without waiting excessive amounts of time. The delay is "washed out" in daylight.

The combination of thermistor TH, photocell PC, and relay coil RC allows the control OLC to distinguish between three light conditions, namely light below the operating threshold established by the relay coil and the photocell, light above the threshold, and very bright light such as full daylight. The ranges of operation may be adjusted as needed. For example, the thresholds between the range of darkness and the dim light may be shifted by using a relay or a photocell having different characteristics. Furthermore, the range in which the delay washes out may be adjusted by changing the characteristic of the thermistor. However the ranges discussed are typical for use in outdoor lighting controls.

The invention overcomes the bilateral delays of ordinary thermal controls and overcomes the lack of delays in relay controls. It furnishes a unilateral delay that is washed out in daylight.

While embodiments of the invention have been described in detail, it will be evident to those skilled in the art that the invention may be embodied otherwise.

What is claimed is:

1. A control, comprising:
   a switch for use in an electric line;
   operating means for operating said switch and responsive to ambient light in a first light range at a slower rate than to ambient light in a second light range dimmer then the first light range and ambient light in a third light range brighter than the first light range.

2. A control as in claim 1, wherein said first light range is between 2 and 10 foot candles, said second light range is less than 1 foot candle and said third light range is greater than 20 foot candles.

3. A control as in claim 1, wherein said operating means includes:
   a light responsive member,
   actuating means coupled to said light responsive member for opening and closing said switch in response to said light responsive member, and
   a positive temperature coefficient thermistor coupled to said light responsive member and said actuating means for limiting energy to said actuating means on the basis of light impinging on said light responsive member.

4. A control as in claim 3 wherein, said first light range is between 2 and 10 foot candles, said second light range is less than 1 foot candle and said third light range is greater than 20 foot candles.

5. A control as in claim 1, wherein said operating means includes:
   a photoresistor having an impedance which drops as brightness increases;
   a relay coil coupled in series with said photoresistor for opening the switch when current through said relay coil drops below one value and for closing the switch when current through the switch exceeds a second value; and
   a positive temperature coefficient thermistor connected across said coil for drawing current away from said relay coil when the resistance of said photoresistor goes from high to low.

6. A control as in claim 5, wherein said first light range is between 2 and 10 foot candles, said second light range is less than 1 foot candle and said third light range is greater than 20 foot candles.

7. A control as in claim 1, wherein said operating means responds to the light in the first light range in a period of fifteen seconds and more and responds to light in the second and third light range in a period less than one second.

8. A control as in claim 2, wherein said operating means responds to the light in the first light range in a period of fifteen seconds and more and responds to light in the second and third light range in a period less than one second.

9. A control as in claim 3, wherein said operating means responds to the light in the first light range in a period of fifteen seconds and more and responds to light in the second and third light range in a period less than one second.

10. A control as in claim 4, wherein said operating means responds to the light in the first light range in a period of fifteen seconds and more and responds to light in the second and third light range in a period less than one second.

11. A control as in claim 5, wherein said operating means responds to the light in the first light range in a period of fifteen seconds and more and responds to light in the second and third light range in a period less than one second.

12. A control as in claim 6, wherein said operating means responds to the light in the first light range in a period of fifteen seconds and more and responds to light in the second and third light range in a period less than one second.

13. A lighting system comprising:
   a power source;
   a plurality of power lines;
   a lamp; and
   an outdoor lighting control,
   said outdoor lighting control including a switch in one of said lines;
   said outdoor lighting control further including operating means coupled to said switch for responding to ambient light in a first light range at a slower rate than to ambient light in a second light range dimmer than the first light range and ambient light in a third light range brighter than the first light range.

14. A system as in claim 13, wherein said first light range is between 2 and 10 foot candles, said second light range is less than 1 foot candle and said third light range is greater than 20 foot candles.

15. A system as in claim 13, wherein said operating means includes:
a light responsive member,
actuating means coupled to said light responsive member for opening and closing said switch in response to said light responsive member, and
a positive temperature coefficient thermistor coupled to said light responsive member and said actuating means for limiting energy to said actuating means on the basis of light impinging on said light responsive member.

16. A system as in claim 15, wherein said first light range is between 2 and 10 foot candles, said second light range is less than 1 foot candle and said third light range is greater than 20 foot candles.

17. A system as in claim 13, wherein said operating means includes:
a photoresistor having an impedance which drops as brightness increases;
a relay coil coupled in series with said photoresistor for opening the switch when current through said relay coil drops below one value and for closing the switch when current through the switch exceeds a second value; and
a positive temperature coefficient thermistor connected across said coil for drawing current away from said relay coil when the resistance of said photoresistor goes from high to low.

18. A system as in claim 17, wherein said first light range is between 2 and 10 foot candles, said second light range is less than 1 foot candle and said third light range is greater than 20 foot candles.

19. A system as in claim 13, wherein said operating means responds to the light in the first light range in a period of fifteen seconds and more and responds to light in the second and third light range in a period less than one second.

20. A system as in claim 14, wherein said operating means responds to the light in the first light range in a period of fifteen seconds and more and responds to light in the second and third light range in a period less than one second.

21. A control, comprising:
a switch for switching an electric line on and off;
operating means coupled to said switch and sensitive to incident light striking said operating means for operating said switch at a slower rate in response to rising incident light than in response to declining incident light.

22. A control as in claim 21, wherein:
said operating means serves for operating said switch substantially instantaneously in response to declining incident light.

23. A control as in claim 21, wherein:
said operating means serves for operating said switch in response to incident light rising into a given range of intensities at a slower rate than in response to incident light declining below the range of intensities.

24. A control as in claim 21 wherein said operating means serves for operating said switch at a slower rate in response to incident light rising into a given range of intensities than in response to incident light declining below the given range of intensities; and
said operating means serves for operating said switch substantially instantaneously in response to incident light declining below the given range of intensities.

25. A control as in claim 21, wherein:
said operating means serves for turning said switch off in response to rising incident light.

26. A control as in claim 23, wherein:
the response to incident light rising into the given range causes a delay in operating the switch more than 15 seconds.

27. A light control as in claim 21, wherein:
said operating means serves for operating said switch in response to incident light rising into a given range of intensities at a slower rate than in response to incident light declining below the given range; and
the response to incident light rising into the given range is delayed more than 15 seconds and response to incident light declining below the given range is substantially immediate.

28. A control as in claim 21, wherein:
said operating means includes a photoresistor and a temperature sensitive resistor coupled to each other and coacting for determining the speed at which said operating means operates said switch.

29. A control as in claim 23, wherein:
said operating means includes a photoresistor and a temperature sensitive resistor coupled to each other coacting for determining the range and the speed at which said operating means operates said switch.

30. A lighting system, comprising:
a power source;
a power line;
a lamp in said power line; and
an outdoor lighting control coupled to said power line;
said outdoor lighting control including a switch in said power line;
said outdoor lighting control further including operating means coupled to said switch and sensitive to incident light striking the operating means for operating said switch at a slower rate in response to rising incident light than in response to declining incident light.

31. A lighting system as in claim 28, wherein:
said operating means serves for operating said switch in response to incident light rising into a given range of intensities at a slower rate than in response to incident light declining below the given range.

32. A lighting system as in claim 28, wherein:
said operating means serves for operating said switch in response to incident light rising into a given range of intensities at a slower rate than in response to incident light declining below the given range; and
the response to incident light rising into the given range causes a delay in operating the switch more than 15 seconds.

33. A lighting system as in claim 30, wherein:
said operating means includes a photoresistor and a temperature sensitive resistor coupled to each other and coacting for determining the rate at which said operating means operates said switch.

34. A lighting system as in claim 31, wherein:
said operating means includes a photoresistor and a temperature sensitive resistor coupled to each other and coacting for determining the range and the rate at which said operating means operates said switch.

* * * * *